April 23, 1957 J. HOPE 2,789,854
SWING-JACK SPACE-GUARD
Filed March 10, 1952 3 Sheets-Sheet 1
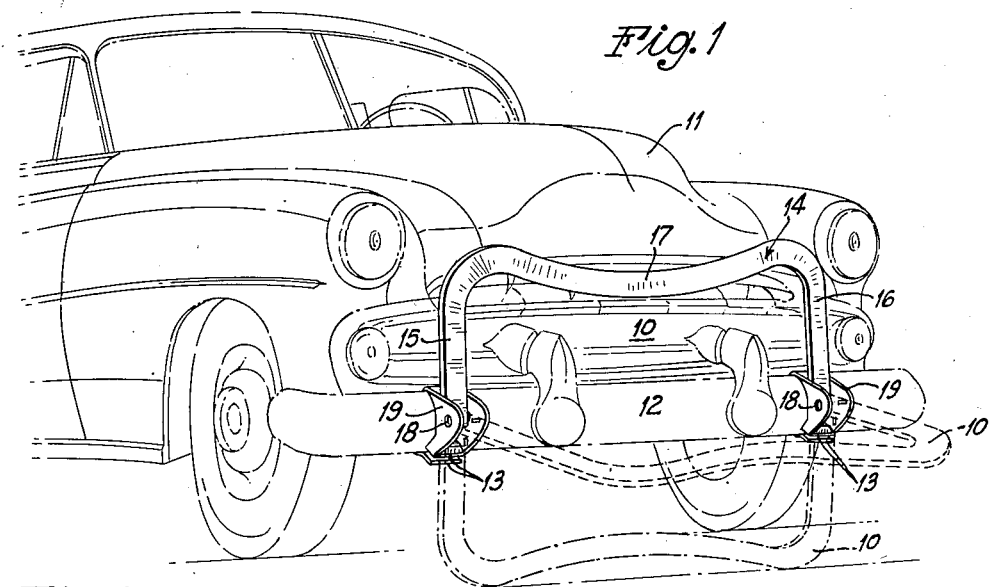
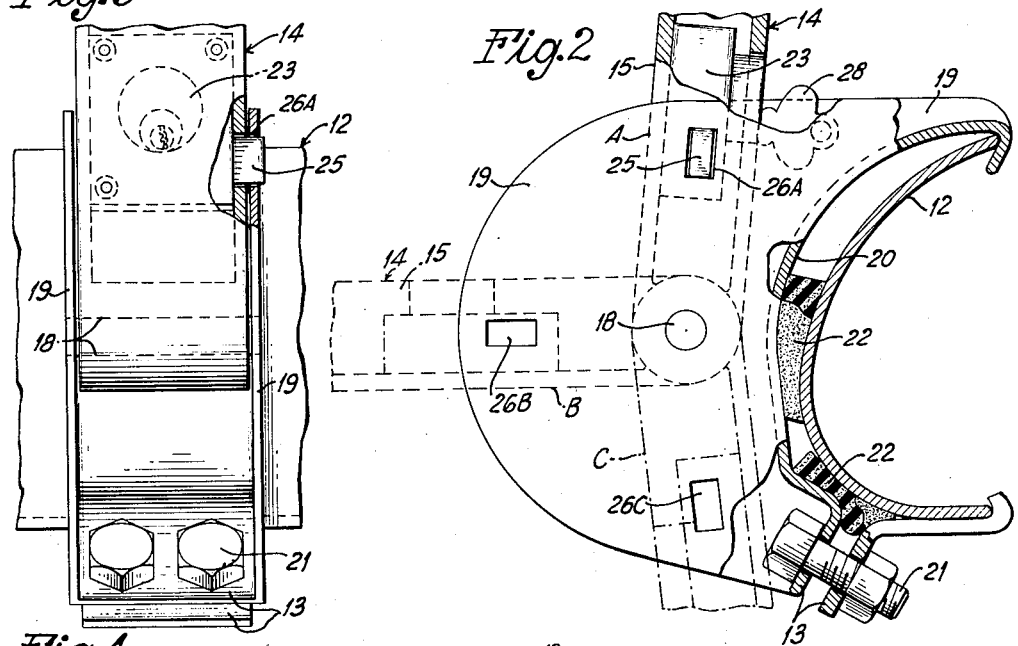
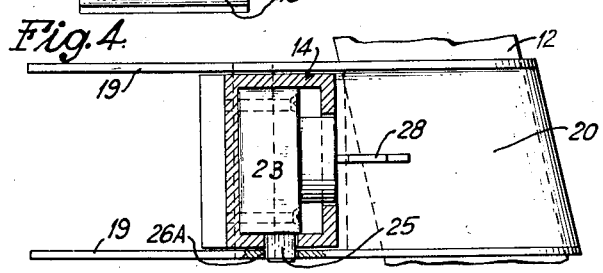
INVENTOR.
James Hope
BY
Hugh S. Wertz
ATTORNEY April 23, 1957    J. HOPE    2,789,854
SWING-JACK SPACE-GUARD
Filed March 10, 1952    3 Sheets-Sheet 2
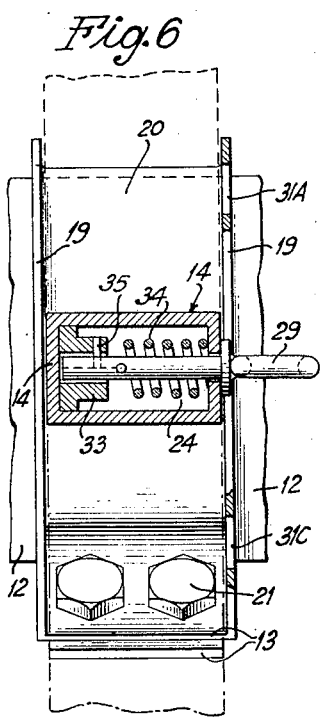
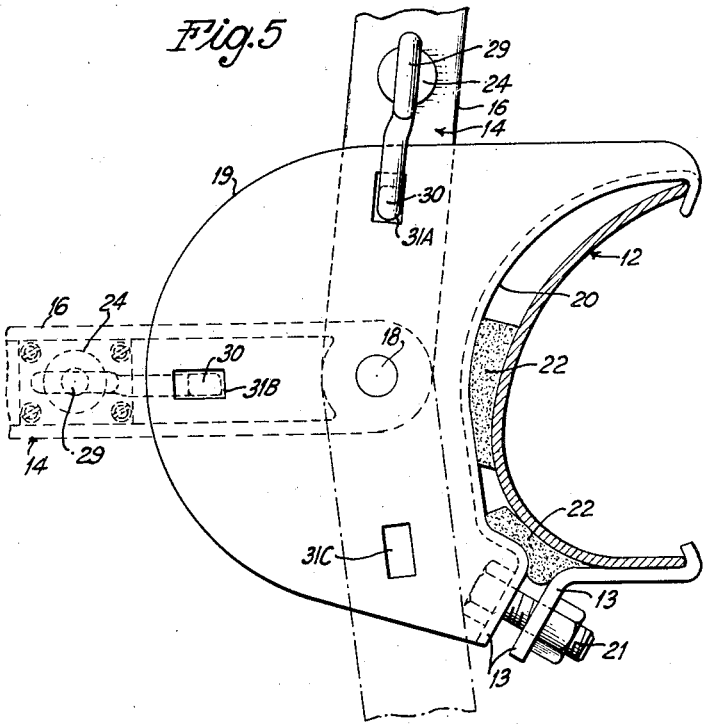
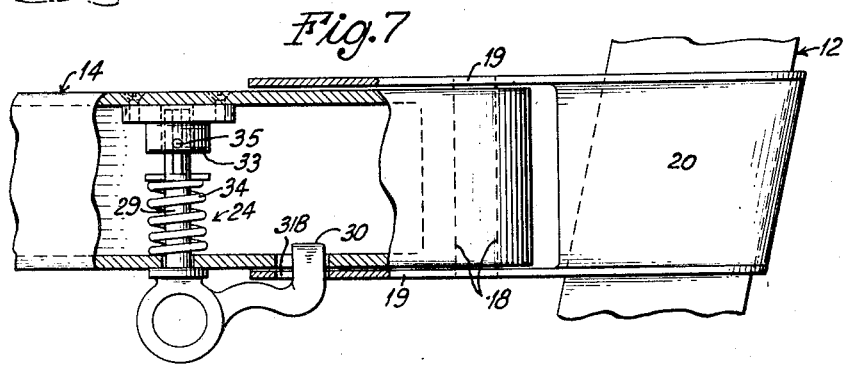
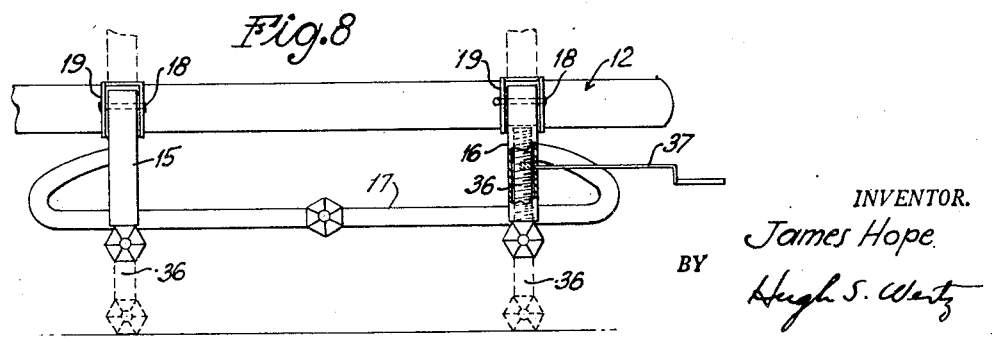
INVENTOR.
James Hope
BY
Hugh S. Wertz
ATTORNEY April 23, 1957   J. HOPE   2,789,854
SWING-JACK SPACE-GUARD
Filed March 10, 1952   3 Sheets-Sheet 3

INVENTOR
JAMES HOPE
BY
Hugh S. Wertz
ATTORNEY

United States Patent Office 2,789,854
Patented Apr. 23, 1957

2,789,854

SWING-JACK SPACE-GUARD

James Hope, Bronx, N. Y.

Application March 10, 1952, Serial No. 275,847

2 Claims. (Cl. 293—69)

This invention relates to automobile accessories and more specifically to devices operable as space-guards and jacks for automobiles. Such devices are called herein "swing-jack space-guards."

It is an object of this invention to provide improved apparatus for automobiles to make possible the reservation of parking space and which can also be used as a jack to raise the wheels thereof.

It is another object of this invention to provide improved apparatus suitable for the front and rear of automobiles to facilitate the following functions: (1) to assure the reservation of parking space; (2) to provide a rigid protective device for the exposed front and rear portions of automobiles; and (3) to provide a simple, safe device for jacking-up the front or rear wheels of automobiles for the purpose of changing tires or wheels.

In crowded cities and towns, auto parking space at the curb is frequently at a premium. All too often after a car has been parked in a suitable place and left unattended by the operator, it has been pushed forward or backward by another car, leaving an inadequate space between the two cars or between the first car and another parked car. In other cases, even though the first car is not moved, the second car may park so close to it that it is impossible to get the first car out of the parking space without extensive maneuvering.

Various forms of bumpers and racks have been proposed to alleviate this difficulty. Some of these racks have been of the kind which can be swung from a vertical position when not in use to a horizontal position when it is being utilized as a space guard, while others have occupied a permanent horizontal position in front of the car. None has been entirely satisfactory, however, since either they have been too flimsy in construction to serve as bumpers, have been difficult to operate, or have been so constructed that they cannot be locked into both horizontal and vertical positions. None of these disadvantages is present in the space-guard of this invention.

In accordance with one aspect of the invention, a space-guard is provided which is constructed of sturdy bumper material and which can be swung from a locked vertical position to a locked horizontal position when it is being used to ensure proper space between cars while the car is parked. The locking is key-controlled so that an unauthorized person cannot move the space guard out of position. This is an important advantage of the present invention since none of the space-guards used heretofore have been key-controlled and obviously a space-guard cannot fulfill its duty properly if it can be shifted out of position against the wishes of the car operator. The space-guard is preferably attached to either or both bumpers by clamps but it may be attached to other parts of the chassis.

The present invention, in addition to its function as a space-guard, also has important advantages when used as a jack. Referring specifically to the invention's application as a jack, it is a well-known fact, borne out by statistics, that thousands of motorists have been maimed, injured and killed during the procedure involved in the changing of tires. The principal cause of these casualties has usually been an accident incurred during the handling of the jack. Motorists have been crushed by cars slipping off jacks; they have been injured because of mechanically defective jacks; they have been struck by passing cars, usually at night, while adjusting jacks; and, all too often, motorists have been stranded on lonely highways because they could not change a tire for lack of an adequate jack.

The merit of this invention is its inherent safety when utilized as a jack plus its sheer simplicity of operation. The motorist need never reach under the car to make an adjustment of position. He simply lowers the (now) swing-jack so that it rests on the ground, then gets back in his car and drives forward about twelve inches. That is all. The front wheels are now completely off the ground, and the swing jack is automatically locked in place so that an accident is practically impossible. For flat tires on the rear wheels, the rear space guard is used and the car is backed instead of driven forward. If desired, a movable jack member can also be incorporated in the swingable bumper member.

Further uses of the invention are as a buffer-zone against "Sunday drivers" during heavy holiday traffic, and as a baggage rack.

The invention will be more readily understood by referring to the following description taken in connection with the accompanying drawings forming a part thereof, in which:

Fig. 1 is a perspective view of a swing-jack space-guard in accordance with the invention, the guard being shown attached to the front bumper of an automobile and in the raised position, two other positions being indicated by dashed lines and by dash-dot lines, respectively;

Fig. 2 is a partial side elevation view, with parts in cross-section, of a key-locked portion of the guard of Fig. 1 (and also that of Fig. 8) and of the front car bumper to which it is attached, the guard being shown in solid lines in the raised position, in dashed lines in the intermediate or space-guard position, and in dash-dot lines in the lower or jack position;

Fig. 3 is a front elevation view of a key-locked portion of the guard of Fig. 1 (and also that of Fig. 8) and of the bumper to which it is attached;

Fig. 4 is a plan view with parts in cross-section, of a key-locked portion of the guards of Figs. 1 and 8 and of the bumper to which it is attached;

Fig. 5 is a partial side elevation view, with parts in cross-section, of a spring-latched portion of the guard of Fig. 1 (and also that of Fig. 8);

Fig. 6 is a partial front elevation view of the arrangement of Fig. 5;

Fig. 7 is a partial plan view, with portions in cross-section, of the arrangement of Fig. 5;

Fig. 8 is an elevation view of a modification of the guard of Fig. 1 wherein a movable jack member is used with the guard.

Figure 9:
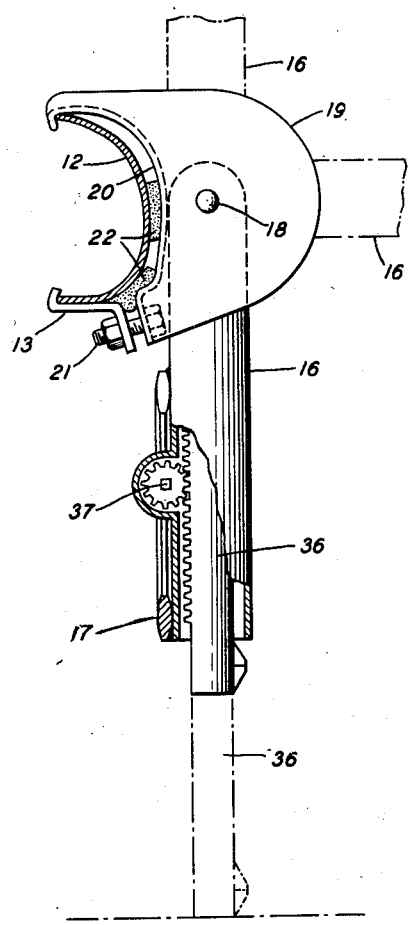
Fig. 9 is a side view, with portions broken away and drawn to a larger scale, of the guard schematically shown in Fig. 8.

Referring more specifically to the drawings, Fig. 1 shows a swing-jack space-guard 10, in accordance with the invention, attached to an automobile 11 by any suitable means. While Fig. 8 is the preferred embodiment, it is convenient to describe first the simpler embodiment of Fig. 1. The two embodiments are mechanically substantially alike except for the fact that Fig. 8 has, in addition, a movable jack member. Returning now to the description of Fig. 1, the guard 10, which is shown in full lines in the raised position, in dashed lines in the intermediate position, and in dash-dot lines in the lower position, is attached to the front bumper 12 of the car 11 by brackets or clamps 13 which preferably form part of the guard 10. It is to be understood, however, that the space-guard can form a part of the bumper (either front or rear) and applied at the car factory directly on the machine. Alternatively, the guard can be attached to some other part of the car chassis.

The guard 10 comprises a bumper member 14 of sturdy metallic or plastic material having two side portions 15 and 16 and an intermediate portion 17. Preferably all three portions of the member 14 are in one piece. The intermediate portion 17 is generally at right angles to the longitudinal axis of the car but it is not necessarily straight. For example, the member 17 has been shown with a slight curvature in Figs. 1 and 2. The side portions 15 and 16 are substantially parallel to the axis of the car and are pivoted around pivots 18 connected between side members 19. These side members are attached to the back member 20 the extremities of which are fashioned to form the upper jaw of the clamp 13. The two members of each clamp 13 are spread to fit over the bumper 12 and are tightened by bolts 21. Resilient pads 22 of rubber or other suitable material are used to prevent rattle.

The side portions 15 and 16 are, in accordance with the invention, secured in any of three positions, as desired. These three positions are shown in Fig. 2 and designated A, B, and C, respectively. The upper position A is raised and is substantially vertical, say, for example about 5 degrees off true vertical and inclined toward the engine of the car 11. This position can be called the grille guard position since in this position the guard 10 serves to protect the grille of the car. The second position B is substantially horizontal and is the space-guard position to reserve parking space. The bumper member 14, when in this position, may be used also as another bumper (serving as a "buffer-zone" in heavy traffic) or as a baggage rack. When the member 14 is in the lowered position C, it acts as a jack. The position C is preferably inclined a few degrees—say 5 degrees, for example—toward the front of the car. Thus the positions A and C are a little more than 180 degrees apart. To use the member 14 as a jack it is only necessary to swing the member 14 until it rests on the ground in front of the car and then drive the car forward about 12 inches to position C. The opposite applies when the rear wheels are jacked.

The member 14 is locked in any of the positions A, B and C by any suitable means. By way of example, the side portion 15 is shown in Figs. 2, 3, and 4 locked by a key-lock while in Figs. 5, 6, and 7 the side portion 16 is provided with a spring latch 24, but it is to be understood that both side portions can be locked with key locks, if desired. Usually, one key lock is all that is necessary, however The key lock 23 is preferably one of the spring bolt type such as that made by any standard lock manufacturer. The lock has a rounded or rectangular bolt 25 which is adapted to fit within rectangular apertures 26A, 26B, and 26C in one of the side members 19, these apertures being placed to hold the bolt 25 when the side portion 15 is in one or the other of the rasied, horizontal, and lowered positions, respectivley. A key 28 is used to retract the bolt to permit the guard to be moved from one position to the other.

The spring latch 24 comprises an eye bolt 29 having an extension 30 which is adapted to fit within apertures 31A, 31B, or 31C, depending on whether the side portion 16 is in the raised, horizontal, or lowered position. The bolt 29 has a collar 33 which places a spring 34 under compression when the bolt is pulled out to allow the extension 30 to be removed from an aperture 31. The bolt 29 is keyed by member 35 so as not to turn.

In operation, the spring latch is first operated to cause the portion 16 to be unlocked from its position, either raised, horizontal, or lowered. Then the key 28 is inserted into the lock and the bolt 25 retracted so that the side portion 15 can be shifted to its other lockable position, in which position the bolt 25 fits into the appropriate aperture (26A, 26B, or 26C). When this takes place, the extension 30 automatically falls into its appropriate aperture (31A, 31B, or 31C) since the side portions 15 and 16 are moved together. The space guard 10 is thus locked until the key 28 is used again.

When the swing-jack space-guard is utilized as a jack for either of the rear wheels, supplemental triangular wedges may be used under the rear wheels so that traction may be maintained at all times while going up on or coming down from the guard.

If the member 14 is not sufficiently large enough to raise the wheels off the ground far enough to change the tire or wheel, or if it is desired to raise one side more that another, an arrangement like that schematically shown in Fig. 8 can be used. This embodiment differs from that of Fig. 1 in that a pair of jacks 36 is built into the side members 15 and 16. The jacks 36 can be of any well-known type—either hydraulic, screw, or ratchet, for example. When the member 14 is in the lowered position, the jack or jacks 36 can be manipulated in the usual manner, as by the detachable jack handles 37, to raise the wheels as high as desired. Fig. 9 shows in somewhat greater detail and to a larger scale a suitable arrangement employing jacks 36. The side strips 15 and 16 carrying the jacks (16 only is shown in Fig. 9) are attached by any suitable means such as by welding to the horizontal portion 17 of the member 14. For simplicity in the drawings the locking means of Figures 3 through 7 have not been shown but it is obvious that the spring latch of Figs. 5, 6 and 7 and the key lock of Figs. 3 and 4 are intended to be used in this embodiment also.

Obviously, various changes in the embodiments described above can be made without departing from the spirit of the invention, the scope of which is indicated in the claims.

What is claimed is:

1. A swing-jack space-guard for an automobile bumper comprising a pair of spaced clamping means attached to said bumper, a pair of side members attached to each of said clamping means in such a way that said members project in planes which are substantially vertical, one of the members of each pair having upper, middle and lower apertures therein, a sturdy bumper member having an intermediate portion and two side portions, means for pivoting each side portion between a respective pair of said members, a retractable member in each of said side portions adapted to be locked in any one of the three apertures as desired, said apertures in each of said side members being so positioned that when its corresponding retractable member is in the upper one of the three apertures the side portions are raised in a substantially vertical position, when the retractable member is in the middle of the three apertures the side portions extend substantially horizontally from the bumper and when the retractable member is in the lower one of the three apertures the side portions are lowered in a substantially vertical position, and jack means in said side members, said jack means having a movable member therein whereby a portion of the automobile can be raised from the ground when the bumper member is locked in its lowered position.

2. The combination of elements as in claim 1 in further combination with key lock means for controlling the locking of at least one of said retractable members.

References Cited in the file of this patent

UNITED STATES PATENTS

| | | |
|---|---|---|
| 968,800 | Randerson | Aug. 30, 1910 |
| 1,397,741 | Procunier | Nov. 22, 1921 |
| 1,627,317 | Cox | May 3, 1927 |
| 2,213,840 | Hoecker | Sept. 3, 1940 |
| 2,230,516 | Radtke | Feb. 4, 1941 |

FOREIGN PATENTS

| | | |
|---|---|---|
| 353,708 | Great Britain | July 30, 1931 |